US006367586B1

(12) United States Patent
Tally

(10) Patent No.: US 6,367,586 B1
(45) Date of Patent: Apr. 9, 2002

(54) OIL LIFT DRAIN

(75) Inventor: Kevin L. Tally, Rural Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 09/412,820

(22) Filed: Oct. 5, 1999

(51) Int. Cl.[7] ............................................. F16C 3/14
(52) U.S. Cl. ..................... 184/1.5; 141/231; 280/47.26
(58) Field of Search ............................. 184/1.5; 141/1, 141/98, 231; 222/135; 280/47.26

(56) References Cited

U.S. PATENT DOCUMENTS

| | | | | |
|---|---|---|---|---|
| 2,717,660 A | * | 9/1955 | Reisert et al. | 184/1.5 |
| 4,235,264 A | * | 11/1980 | Rau et al. | 141/1 |
| 4,266,693 A | * | 5/1981 | Pfeiffer | 222/135 |
| 4,274,645 A | * | 6/1981 | Ferguson et al. | 280/47.26 |
| 5,238,213 A | | 8/1993 | Pool | |
| 5,549,227 A | * | 8/1996 | Klotz | 222/461 |
| 5,921,262 A | * | 7/1999 | Campbell | 137/1 |

OTHER PUBLICATIONS

John Dow Industries Brochure, pre–1998.
Todd Automotive/Industrial Catalog, pre–1998.
Lincoln Manufacturing Catalog, pre–1998.
"Lisle Lubrication & Tire Products" brochure 1998; printed Oct. 1998.
"Lisle Lube & Tire Clip Art", p. 1.

* cited by examiner

Primary Examiner—David Fenstermacher
(74) Attorney, Agent, or Firm—Banner & Witcoff, Ltd.

(57) ABSTRACT

An oil lift drain includes a molded plastic container with a projecting upward centerline spout connected by a hollow handle to the interior of the container. Two telescoping tubes are fitted within and project from the spout and include adjustable brackets or clamps. A funnel is supported on top of the adjustable tubes.

17 Claims, 3 Drawing Sheets

FIG. 5
FIG. 7
FIG. 6
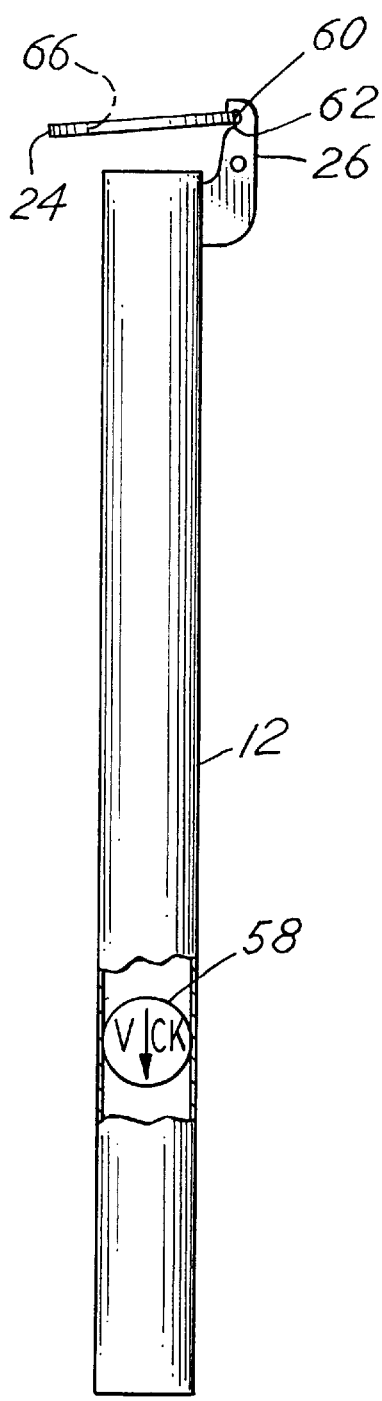
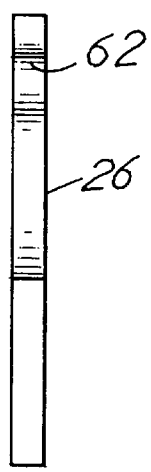
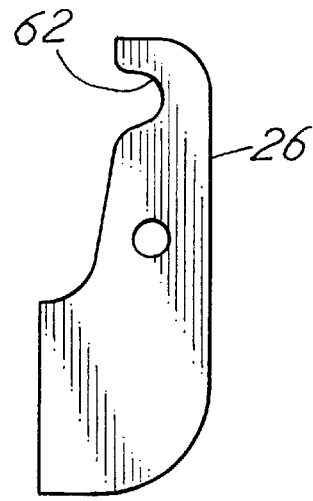

OIL LIFT DRAIN

BACKGROUND OF THE INVENTION

In a principal aspect, the present invention comprises an oil lift drain, and more particularly, an oil lift drain having a container for collection of the oil discharged into telescoping tubes extending upwardly from the container and connected to a funnel that may be positional under an oil pan of a vehicle.

When servicing vehicles, such as automobiles and trucks, the mechanic often places the vehicle on a lift for access to the underside thereof. One of the service functions typical in this situation is evacuation of the oil pan of the vehicle. This is accomplished by removing the drain plug of the oil pan and collecting the oil as it drains from the pan in a container. It has been common practice to use oil lift drains to collect the oil. Oil lift drains typically comprise a container mounted on wheels with a projecting vertical tube supporting a funnel at the distal upper end. The funnel is placed underneath the open drain of the oil pan and diverts the used oil through the funnel into the descending tube and then into the collection container. Various designs of such oil lift drains have been available. Desirable features include easy adjustability, portability, and the capacity to be assembled and disassembled easily for shipment if necessary.

SUMMARY OF THE INVENTION

Briefly, the present invention comprises an oil lift drain having a container with a horizontal cross sectional configuration that is generally rectangular with rounded edges, and more particularly, a horizontal cross sectional shape that is square with rounded edges. The container is made from a molded, plastic material and includes a vertically projecting nozzle from the top side with a hollow handle connecting from the nozzle to the inside of the container. Within the container is a special rib channel that coacts with a telescoping tube that fits into the container. The container is mounted on casters. First and second telescoping tubes project from the nozzle of the container vertically upward and support a funnel. The telescoping tubes may be adjusted at the site of use of the oil lift drain by means of a locking ring which fits around the upper tube and is supported by a bracket attached to the lower tube.

Thus, it is an object of the invention to provide an improved oil lift drain which may be easily packaged in a kit for transport to a service site.

It is a further object of the invention to provide an improved oil lift drain which includes vertical drain tubes that are easily adjusted.

Yet a further object of the invention is to provide an oil lift drain with a container that can be easily transported and from which collected fluid may be poured safely and easily.

Another object of the invention is to provide an oil lift drain with a molded plastic container that includes bulging sides to prevent "oil canning" of the sides during filling and pouring from the container.

These and other objects, advantages and features of the invention will be set forth in the detailed description which follows.

BRIEF DESCRIPTION OF THE DRAWING

In the detailed description which follows, reference will be made to the drawing, comprised of the following figures:

FIG. 5 is a side elevation of a first tube of the oil lift drain of the invention;

FIG. 6 is a side elevation of the hook or bracket and lock ring construction which is utilized to control telescopic extension of the tubes utilized in the oil lift drain of the invention; and FIG. 7 is an end view of the bracket or hook and lock ring of FIG. 6;

DESCRIPTION OF THE PREFERRED EMBODIMENT

Figure 1:
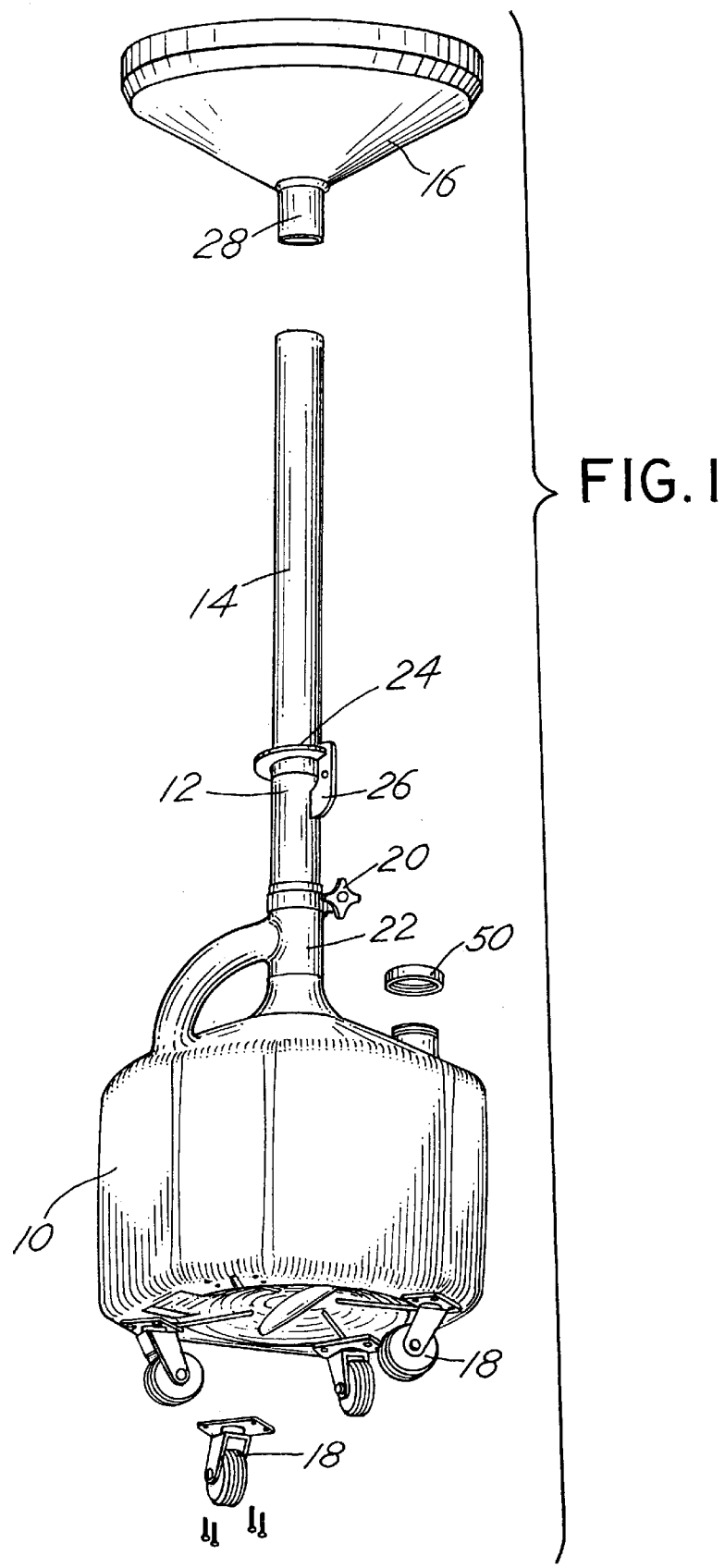
FIG. 1 is an isometric view of the oil lift drain of the invention.

The oil lift drain of the invention is comprised of a number of separate component parts which may be placed in a typical rectangular, parallel piped shipping box. Thus, the oil lift drain includes a container 10 with a first tube 12 inserted into the container telescopically. A second, upper tube 14 is inserted into the first tube 12 and a funnel 16 is mounted on the second tube 14. Casters or wheels 18 support the container 10 rendering it mobile.

A clamp 20 affixed to a nozzle 22 of container 10 may be tightened or loosened in order to adjust the telescopic position of the first tube 12. A lock ring 24 which cooperates with a bracket or hook 26 mounted on the first tube 12 provides for telescopic adjustment of the second tube 14 within the first tube 12. The funnel 16 includes a centered, cylindrical tubular outlet 28 which fits within the second tube 14 to thereby be retained in position by the tube 14.

Figure 2:
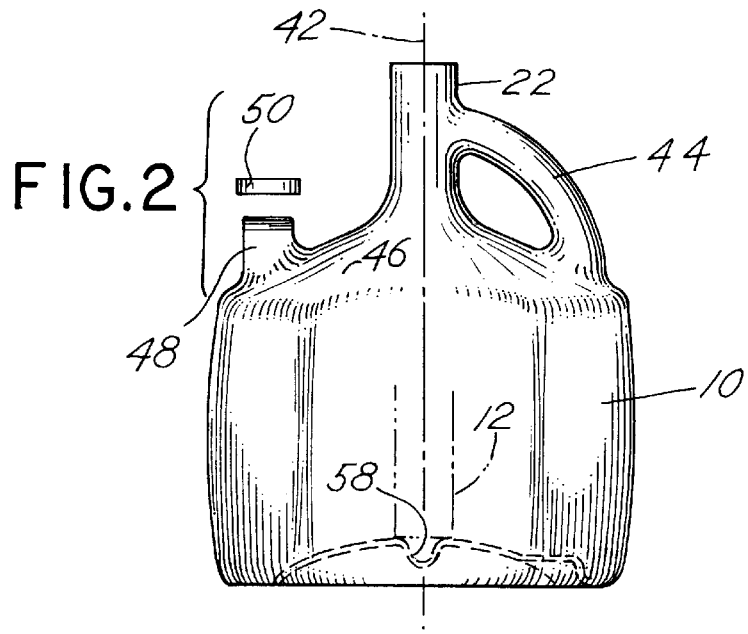
FIG. 2 is a side elevation of the container of the oil lift drain of the invention.
Figure 3:
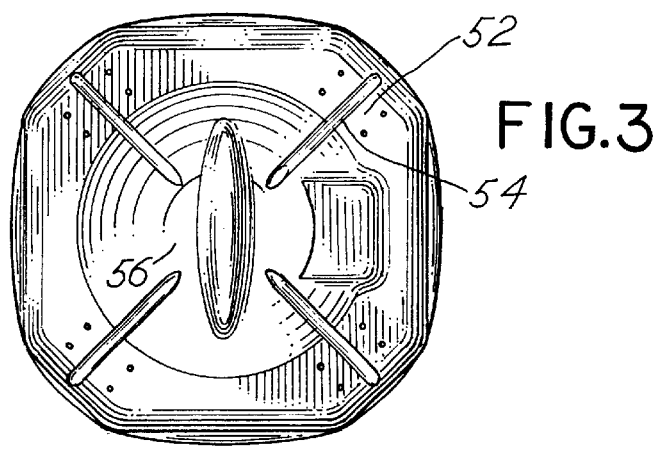
FIG. 3 is a bottom view of the container of FIG. 2.
Figure 4:
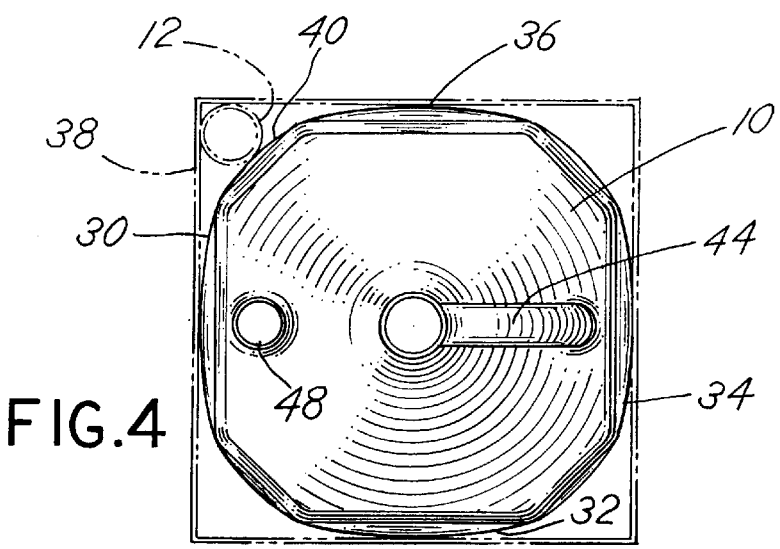
FIG. 4 is a top plan view of the container of FIG. 2.

Referring to FIGS. 2, 3 and 4 there is depicted in greater detail the construction of the container 10. The container 10 has a generally rectangular, and more particularly, a generally square cross section in the horizontal plane with the corners thereof being generally rounded. This particular configuration of the container 10 enables the container to be more easily or more efficiently packed in a rectangular, parallelpiped packing box. The side of the packing box can thus fit against the lateral sides of the container 10. For example, the container 10 includes lateral sides 30, 32, 34 and 36. Those sides can be positioned against the sides of a rectangular, parallelpiped shipping box such as shown in phantom as box 38 in FIG. 4. The container 10 further includes rounded corners such as corner 40. In this manner, there is a space in the box 38 adjacent each rounded corner 40 into which a tube 12, for example, may be packed for shipment. An exemplary position of the tube 12 is depicted in FIG. 4.

The sides 30, 32, 34 and 36 of the container 10 are molded in a configuration in which they bulge outwardly. This precludes or helps prevent "oil canning" of the container walls 10 when the container 10 is being filled or emptied of fluid. The container 10 is typically made from a molded plastic material, for example, a high density polyethylene. The container 10 further includes a upwardly projecting vertical nozzle 22 having a center axis 42 for the container 10. The construction of the container 10 is generally symmetrical about the axis 42. The container 10 further includes a hollow handle 44 which is integrally molded with the container 10 and connects with the top surface 46 of the container 10 adjacent the wall 34 to a midpoint of the nozzle 22. The handle 44 is hollow to enable release of air when pouring from the nozzle 22. This precludes splashing and unwanted diversion of fluid as it flows from the nozzle 22.

The top 46 of the container 10 further includes a spigot 48 with a cap 50 that may be threadably attached thereto. The bottom of the container 10 is especially formed or shaped to receive casters or wheels 18 and includes a hand held model there in. Thus, pad sections 52 are molded about the periphery of the container 10 adjacent corners such as corner 40. The pad sections 52 each include a rib 54 which extends radially inward from pad 52 toward axis 42. The rib 54 is positioned in combination with each of the pads or pad sections 52 and provides reinforcement of the bottom wall 56 of the container 10 thereby increasing the rigidity of the container 10. The bottom wall 56 is bulged inwardly and upwardly along axis 44 and includes a channel 59 molded therein. The channel 59 as depicted in FIG. 2 is positioned to support the bottom end of first tube 12 so that liquid flowing into the container 10 through the tube 12 will have a pathway to fill the container 10.

The nozzle 22 extends upwardly and receives the cylindrical tube 12. The cylindrical tube 12 includes the hook 26 attached at the upper end thereof as depicted in FIG. 5. The tube 12 may further include a check valve 58 therein. The check valve 58 is provided to preclude back flow of fluid draining downwardly through the tube 12. The check valve 58 is an optional feature.

The second tube 14 slidably telescopes within the first tube 12. The second tube 14 is likewise a hollow cylindrical tube. The bracket 26 supports a ring 24. The ring 24 is in the shape of an annular washer and includes an inner diameter which is greater than the diameter of the second tube 14 so that the second tube 14 may easily slide within the ring 24. The ring 24 thus fits around the tube 14. One outer edge 60 of the ring 24 fits within a recess or slot 62 of the bracket 26. The recess 62 is shaped to permit the ring 24, by virtue of gravity, to cant downwardly so that the inner edge 66 of the annular ring 24 can engage against the outer surface of tube 14 and preclude its movement downward. Pulling upwardly on the tube 14, however, releases the edge 66 therefrom and permits upward adjustment of the upper tube 14 within the lower tube 12. This upward adjustment may be effected by one hand motion and movement of the tube 14 axially upward. To move the tube 14 downwardly within the tube 12, an operator must manually grip the outer edge of the ring 24 and lift that outer edge thereby releasing the engagement of edge 66 with tube 14 and permitting downward adjustment.

The bracket 26, and in particular, the shape of the notch therein insures a limited range of movement of the ring so as to effect the locking feature thereof. It is to be noted that the ring 24 may be rotated around the axis 44 so as to expose a sharpened edge 66 of the ring 24 to engage the outer surface of tube 14. It is to be noted that the tubes 12 and 14 are cylindrical and that the edges of the tubes 12,14 are perpendicular to the axis 44 and are not canted or cut at an angle in the embodiment.

There has been described a preferred embodiment of the invention. It is to be understood there are certain variations that may be effected while still remaining within the scope of the invention. Thus, the invention is to be limited only by the following claims and equivalents thereof.

What is claimed is:

1. Apparatus for collecting fluid from an elevated discharge outlet comprising in combination:
    a container having a top, a generally rectangular, horizontal cross sectional shape with rounded corners, a tubular nozzle projecting from the top of the container, said nozzle defining a vertical axis, said container further including a bottom, with a horizontal channel in the bottom on the inside of the container aligned to be intersected by the axis of the nozzle;
    a first telescoping tube slidably and telescopically fitted in the tubular nozzle and capable of connecting to the channel to define a fluid pathway through the first tube and channel to the interior of the container;
    means for adjustably fixing the telescoped position of the first tube in the nozzle;
    a funnel for receipt of fluid;
    a fluid connector conduit connected at one end to the funnel, said connector conduit supporting the funnel and telescopically inserted in the first tube for adjusting the elevation of the funnel; and
    means for retaining the conductor conduit in a fixed telescoped position in the first tube.

2. The apparatus of claim 1 wherein the container is a molded plastic material and includes side sections prebulged outwardly.

3. The apparatus of claim 1 including a clamp for retaining the first tube connected to the container nozzle and releasable to adjust the telescope position of the first tube in the nozzle.

4. The apparatus of claim 1 including wheels attached to the bottom of the container for movement of the container and apparatus.

5. The apparatus of claim 1 wherein the nozzle, first tube, second tube and funnel are generally symmetrical about the axis.

6. The apparatus of claim 1 wherein the second tube telescopically fitted into the first tube, further includes a ring member encircling the second tube and having an internal dimension greater than the external dimension of the second tube, said first tube including a bracket with a slot transverse to the axis, said slot engageable with the ring to cause the ring to become canted to hold the second tube in a fixed position relative to the first tube.

7. The apparatus of claim 1 including a check valve in the first tube to prevent back flow from the container.

8. The apparatus of claim 1 including a hollow handle connecting the top of the container to the nozzle.

9. The apparatus of claim 1 wherein the bottom of the container includes a hand hold depression.

10. The apparatus of claim 1 wherein the bottom of the container is a molded plastic material.

11. The apparatus of claim 10 including casters affixed to the bottom of the container, said container including a molded pad for attachment of each caster and further including a radial reinforcing rib extending from the pad toward the axis.

12. Apparatus for collecting fluid from an elevated discharge outlet comprising, in combination:
    a container including a top with a filling nozzle projecting upwardly from the top and defining a generally vertical axis;
    a first tube fitted into the nozzle;
    a second tube telescopically fitted into the second tube, said tubes extending axially from the container;
    a funnel connected to the second tube for guiding fluid into the tubes and container, the first tube including a bracket attached to a side of the first tube and projecting axially upward;
    a ring member on the second tube, said ring member having an internal diameter greater than the external diameter of the second tube, said ring member engaged with the bracket for tilting the ring member to engage and retain the second tube in a fixed telescoped position in the first tube and releasable from engaging the second tube upon imposing force in an upward axial direction on the second tube.

13. The apparatus of claim 12 further including wheels supporting the container.

14. The apparatus of claim 12 wherein the first tube is telescopically mounted in the nozzle.

15. The apparatus of claim 12 wherein the component parts form a kit comprised of the container, the first tube, the second tube, the funnel and the ring, said kit members maintained in a package with the container and each tube having a bottom side or end substantially at the same level in a package for the kit.

16. The apparatus of claim 12 or 15 wherein the container has a generally rectangular cross section with rounded corners.

17. The apparatus of claim 12 or 15 wherein the container includes multiple sides which are outwardly bulged.

* * * * *